US009855940B2

(12) United States Patent
Wallace et al.

(10) Patent No.: US 9,855,940 B2
(45) Date of Patent: Jan. 2, 2018

(54) ELECTRONIC STROKE SENSOR FOR AIR DISC BRAKE

(71) Applicant: Indian Head Industries, Inc., Charlotte, NC (US)

(72) Inventors: Thomas Edward Wallace, Charlotte, NC (US); Richard J. Rink, Charlotte, NC (US); Glenn Singletary, Concord, NC (US); Mark David Chandler, Bloomfield, NY (US); Andrew P. Schartner, Charlotte, NC (US)

(73) Assignee: Indian Head Industries, Inc., Charlotte, SC (US)

( * ) Notice: Subject to any disclaimer, the term of this patent is extended or adjusted under 35 U.S.C. 154(b) by 66 days.

(21) Appl. No.: 14/289,152

(22) Filed: May 28, 2014

(65) Prior Publication Data

US 2014/0277928 A1    Sep. 18, 2014

Related U.S. Application Data

(63) Continuation-in-part of application No. 14/054,049, filed on Oct. 15, 2013, which is a continuation of
(Continued)

(51) Int. Cl.
*F16D 66/02* (2006.01)
*B60T 17/22* (2006.01)
(Continued)

(52) U.S. Cl.
CPC ............ *B60T 17/221* (2013.01); *F16D 65/28* (2013.01); *F16D 66/00* (2013.01);
(Continued)

(58) Field of Classification Search
CPC ...... F16D 66/02; F16D 66/021; F16D 66/022; F16D 66/025; F16D 66/026;
(Continued)

(56) References Cited

U.S. PATENT DOCUMENTS 4,172,364 A     10/1979   Young
4,564,756 A  *  1/1986   Johnson .............. H03K 17/968
                                                         250/206
(Continued)

FOREIGN PATENT DOCUMENTS

CA        2 064 334       9/1993

OTHER PUBLICATIONS

International Search Report for International Application PCT/US2011/040895 dated Nov. 3, 2011.
European Search Report dated Jan. 25, 2016, 3 pages.

*Primary Examiner* — Bradley King
*Assistant Examiner* — Stephen Bowes
(74) *Attorney, Agent, or Firm* — Warner Norcross & Judd LLP (57) ABSTRACT

A vehicle brake monitor assembly for an air disk brake includes a brake actuator having a pushrod projecting from inside a chamber of said brake actuator. The pushrod releasably actuates a lever arm of a caliper thereby moving the disk brake into a braking position when the pushrod is in an extended position and releasing the disk brake from the braking position when the pushrod is in a retracted position. The pushrod includes a pushrod shaft and a contact member biased in a telescoping relationship relative to the pushrod shaft and the lever arm of the caliper abuts the contact member counteracting the bias of the contact member. A sensor is integrated with the assembly proximate the contact member and detects movement of the pushrod relative to the lever arm and to the pushrod shaft.

23 Claims, 7 Drawing Sheets

Related U.S. Application Data application No. 13/162,691, filed on Jun. 17, 2011, now Pat. No. 8,616,342.

(60) Provisional application No. 61/356,325, filed on Jun. 18, 2010.

(51) Int. Cl.
  *F16D 65/28* (2006.01)
  *F16D 66/00* (2006.01)
  F16D 121/02 (2012.01)
  F16D 125/58 (2012.01)

(52) U.S. Cl.
  CPC .... *F16D 2066/003* (2013.01); *F16D 2121/02* (2013.01); *F16D 2125/582* (2013.01)

(58) Field of Classification Search
  CPC .. F16D 66/027; F16D 2066/003; B60T 17/22; B60T 17/221; G01D 5/34746; G01D 5/26; G01D 5/264; G01D 5/32; G01D 5/34; G01D 5/341; G01D 5/342; G01D 5/347; G01D 5/34707; G01D 5/34715; G01D 5/34753; G01N 21/55; G01N 21/558; G01L 5/28
  USPC .......................... 250/231.11, 231.13–231.18; 356/139.04–139.06
  See application file for complete search history.

(56) References Cited

U.S. PATENT DOCUMENTS

| | | |
|---|---|---|
| 4,596,319 A | 6/1986 | Cumming |
| 4,800,991 A * | 1/1989 | Miller .................... B60T 17/22 116/208 |
| 4,937,554 A * | 6/1990 | Herman ................... B60Q 1/44 188/1.11 L |
| 4,995,480 A | 2/1991 | Hazelden et al. |
| 5,223,708 A | 6/1993 | Van Deventer |
| 5,433,296 A | 7/1995 | Webberley |
| 5,450,930 A | 9/1995 | Martens et al. |
| 5,791,441 A | 8/1998 | Matos et al. |
| 5,825,287 A | 10/1998 | Zarybnicky, Sr. et al. |
| 6,105,730 A | 8/2000 | Ekeroth |
| 6,255,941 B1 * | 7/2001 | Osterman ............... B60T 17/08 188/1.11 E |
| 6,276,494 B1 | 8/2001 | Ward et al. |
| 6,311,804 B1 | 11/2001 | Baalmann et al. |
| 6,341,670 B1 | 1/2002 | Leblanc et al. |
| 6,352,137 B1 * | 3/2002 | Stegall .................... F16D 65/28 188/1.11 E |
| 6,411,203 B1 | 6/2002 | Lesesky et al. |
| 6,411,206 B1 | 6/2002 | Weant et al. |
| 6,481,542 B2 | 11/2002 | Giering et al. |
| 6,595,045 B1 * | 7/2003 | Fuglewicz ............... B60T 17/08 73/129 |
| 6,608,554 B2 | 8/2003 | Lesesky et al. |
| 6,728,603 B2 | 4/2004 | Pruzan et al. |
| 6,744,352 B2 | 6/2004 | Lesesky et al. |
| 6,755,233 B2 | 6/2004 | Fisher |
| 6,891,468 B2 | 5/2005 | Koenigsberg et al. |
| 7,014,016 B2 | 3/2006 | Morris et al. |
| 7,015,800 B2 | 3/2006 | Lesesky et al. |
| 7,175,006 B2 | 2/2007 | Plantan et al. |
| 7,373,224 B2 | 5/2008 | Goetz et al. |
| 7,449,993 B2 | 11/2008 | Lesesky et al. |
| 7,555,375 B2 | 6/2009 | Pettersson et al. |
| 7,624,849 B2 | 12/2009 | Goncalves et al. |
| 8,319,623 B2 | 11/2012 | Wallace et al. |
| 2003/0222774 A1 | 12/2003 | Koenigsberg et al. |
| 2005/0039988 A1 | 2/2005 | Philpott |
| 2005/0189182 A1 * | 9/2005 | Severinsson .......... F16D 66/026 188/1.11 L |
| 2005/0263687 A1 * | 12/2005 | Kauhanen ............... G01D 5/347 250/231.13 |
| 2007/0045060 A1 | 3/2007 | Pettersson |
| 2007/0179798 A1 | 8/2007 | Inbarajan |
| 2007/0256901 A1 | 11/2007 | Niehorster et al. |
| 2013/0072351 A1 | 3/2013 | Wallace et al. |

\* cited by examiner

Fig-6 ated position and releases the disk brake from the braking position when the pushrod is disposed in a retracted position. The pushrod includes a pushrod shaft and a contact member biased in a telescoping relationship relative to the pushrod shaft. The lever arm of the caliper abuts the contact member and counteracts the bias of the contact member preventing the contact member from telescoping from the pushrod shaft. A sensor is integrated with the assembly proximate the contact member. The sensor detects movement of the pushrod relative to the lever arm and the pushrod shaft.

ELECTRONIC STROKE SENSOR FOR AIR DISC BRAKE

This application is a continuation-in-part of application Ser. No. 14/054,049, filed on Oct. 15, 2013, which is a continuation of application Ser. No. 13/162,691, filed on Jun. 17, 2011, which claims the benefit of U.S. Provisional Patent Application No. 61/356,325, filed on Jun. 18, 2010.

BACKGROUND OF THE INVENTION

The present invention is related to an electronic brake stroke monitor for a vehicle brake. More specifically, the present invention is related to an electronic brake stroke monitor of an air disc brake for use on a heavy duty truck, transit bus or similar commercial vehicle.

The number of miles traveled by heavy-duty trucks and passenger busses increases significantly every year. Because the size of passenger cars being driven has become smaller due to the increased price of gasoline, it has become increasingly necessary to ensure the proper performance of brake actuators and brake systems of these heavy-duty vehicles to provide the truck operator every opportunity to avoid a loss of control. Therefore, various systems have been developed to monitor the stroke of a brake actuator for use on drum brakes widely used in industrial trucking.

However, on heavy-duty passenger vehicles, such as, for example, busses, the use of air disc brakes is becoming more popular. While broad based monitoring has been achieved for drum brakes, monitoring additional conditions known to cause unsafe driving conditions, such as, for example, low brake pad clearance has not been achieved.

Brake monitoring systems used on air drum brakes are directed toward monitoring the length of stroke of a pushrod projecting from inside a chamber of the brake actuator. The monitoring enables the user to determine if the brake actuator is functioning properly, is subject to an over-stroke condition, or is subject to a hanging or dragging brake condition. Monitoring these conditions by monitoring the stroke of the pushrod is possible because the pushrod of the brake actuator is fixedly attached to the actuation device of the drum brake. In the case of a hanging or dragging brake, the actuation device of the drum brake is immobilized in an actuated position preventing the pushrod from returning to an un-actuated position when the brake pedal is released by the vehicle operator.

However, the pushrod of an air disk brake actuator is not fixedly attached to the lever arm of a caliper that actuates the disk brake. Therefore, should a hanging or dragging brake condition occur, the lever arm becomes separated from the pushrod rendering the type of monitoring system used on a drum brake non-functional for a disk brake. An electronic sensor that monitors the stroke of the pushrod senses that the pushrod has returned to its un-actuated position and incorrectly senses that the brake is operating normally. Therefore, it has become necessary to develop a vehicle brake monitoring assembly that is capable of identifying and distinguishing between an over-stroke condition and a hanging brake condition of an air disk brake.

SUMMARY OF THE INVENTION

A vehicle brake monitor assembly for an air disk brake includes a brake actuator having a pushrod projecting from inside a chamber of the brake actuator. The pushrod releasably actuates a lever arm of the caliper moving the disk brake into braking position when the pushrod is disposed in The sensor that is positioned proximate the contact member detects differences in transmission along a length of the contact member that enables the determination of the condition of the brake actuator. For example, the sensor detects when the brake is operating in a normal condition, is subject to a dragging brake condition, is subject to an over stroke condition, or subject to an out of adjustment condition. As set forth above, prior attempts to monitor all these conditions on an air disk brake have proven futile. In particular, prior monitoring devices have been unable to identify a hanging brake condition due to separation between the pushrod and a lever arm of the air disk brake. This separation results when the lever arm is immobilized in an actuated position and a vehicle operator releases a brake pedal causing the pushrod to retract into the brake actuator. The telescoping design of the present invention allows the sensor to detect when the lever arm is immobilized in an actuated position.

A further benefit of the present inventive assembly is its use with a conventional brake caliper without modification to the caliper. Prior attempts to monitor air disk brake systems require modifying the brake caliper in an attempt to determine if the lever arm is immobilized in an actuated position. By providing a sensor pack proximate the pushrod of the actuator, the inventive assembly has eliminated the need to modify the caliper of an air disk brake system, to detect a dragging brake condition.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE INVENTION

Figure 1:
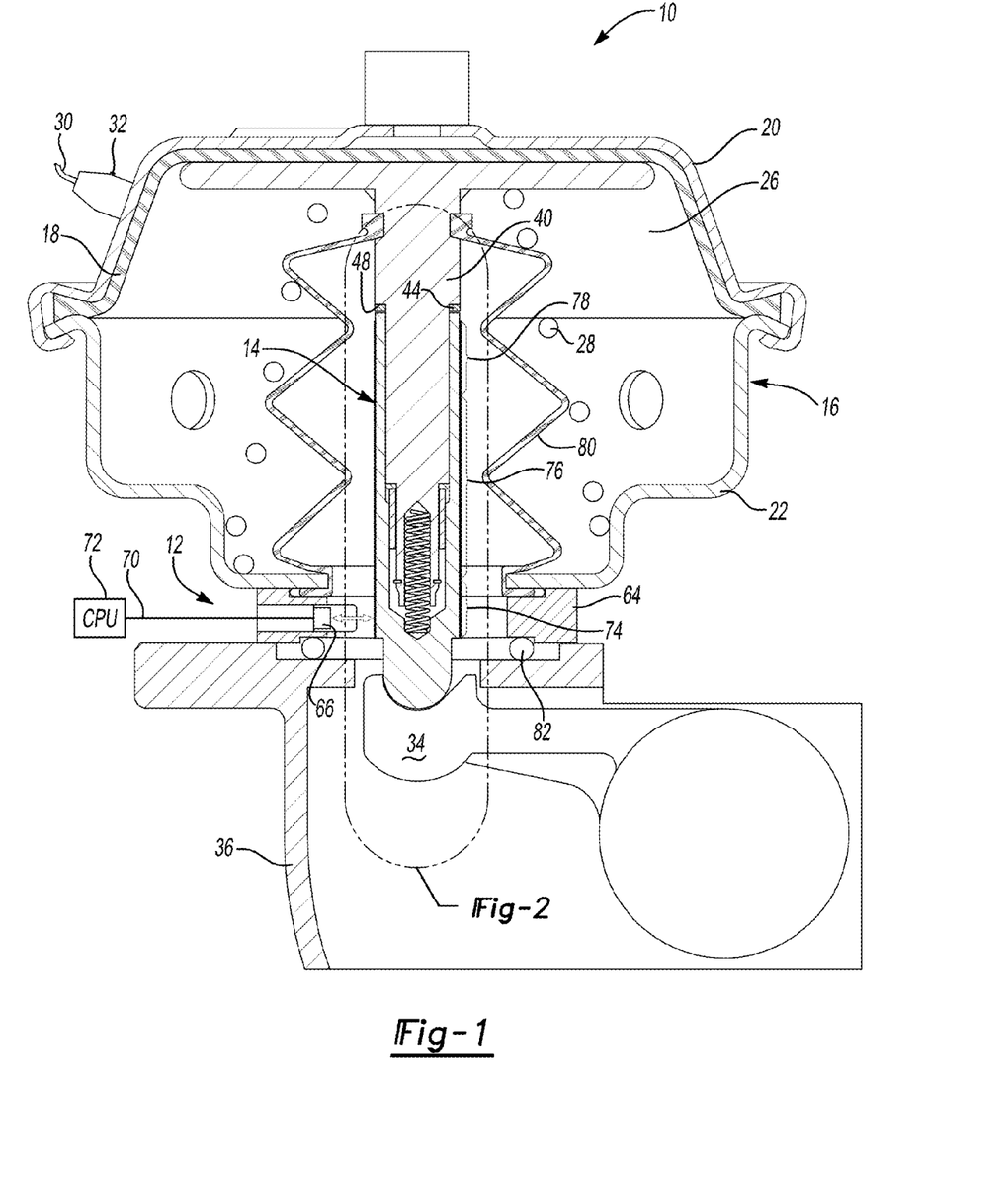
FIG. 1 shows a side sectional view of the brake monitoring assembly of the present invention.

A brake actuator is shown generally at 10 in FIG. 1. The brake actuator 10 includes a brake monitor assembly 12 for determining if the brake actuator is functioning in a normal condition or a fault condition as will be explained further hereinbelow. The brake actuator 10 includes a pushrod 14 disposed inside a service chamber 16. It should be understood by those skilled in the art that the service chamber 16 can also be used in cooperation with a secondary chamber or power spring chamber (not shown), and various other brake activator configurations, as might be necessary for a given vehicle braking system.

The service chamber 16 includes a diaphragm 18 that is secured between an upper housing member 20 and a lower housing member 22. Therefore, the service chamber 16 is separated by the diaphragm 18 into a pressure side 24 (best seen in FIG. 4) and a return side (non-pressure) 26 which houses a return spring 28. Pressurized air enters the pressure side 24 of the service chamber 16 through air pressure port 30, the pressure of which is monitored by pressure sensor 32. Although the pressure sensor 32 is shown proximate the service chamber 16, it is contemplated by the inventors that the pressure sensor 32 is located at the treadle valve (brake pedal) of the vehicle. It should be understood to those of ordinary skill in the art that each embodiment also includes a separate pressure sensor (not shown) located at the brake pedal to identify pressure being applied by the vehicle operator to the brake pedal. When the operator actuates the brake pedal, pressurized air passes through the air pressure port 30 forcing the diaphragm 18 against the pushrod 14 causing the pushrod 14 to extend outwardly from the service chamber 16 in a known manner.

When the vehicle operator depresses the brake pedal, as set forth above, air pressure enters the pressure side 24 of the service chamber 16 through the air pressure port 30 forcing the pushrod 14 outwardly from the service chamber. A lever arm 34 disposed inside a caliper 36 is pivoted by the pushrod 14, when extending outwardly, causing the brakes (not shown) of the vehicle to actuate in a known manner. When the vehicle operator removes pressure from the brake pad, air is vented from the pressure side 24 of the service chamber 16 and the return spring 28 forces the pushrod 14 inwardly of the service chamber 16 allowing the lever arm 34 to return to its unactuated position. It should be understood by those of skill in the art, that the caliper 36 described above functions in a normal manner.

Figure 2A:
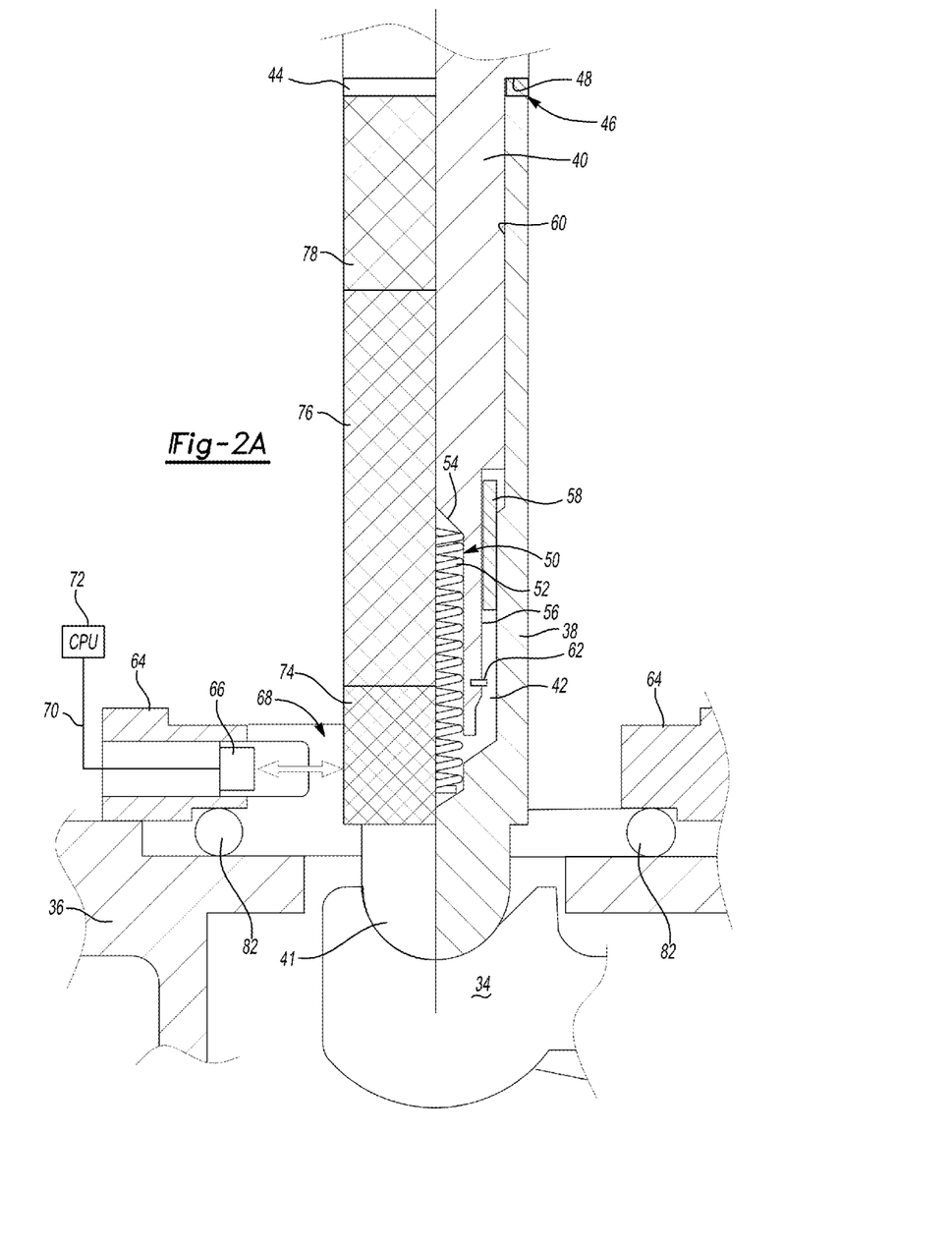
FIG. 2a shows a first embodiment of the pushrod of the present invention.

Referring now to FIG. 2A, the pushrod 14 includes a contact member 38 that circumscribes a pushrod shaft 40. The contact member 38 defines a terminal end 41 that abuts the lever arm 34 of the caliper 36. The pushrod shaft 40 is received in a tubular opening 42 defined by the contact member 38. An adjustment shim 44 is disposed at a base 46 of the tubular opening 42 and is sandwiched between a shaft stop 48 of the pushrod shaft 40 and the base 46. The adjustment shim 44 is provided in a plurality of thicknesses from which the length of the pushrod 14 is adjusted to provide dimensional accuracy between terminal end 41 of contact member 38 and lever arm 34 as will become more evident below.

The pushrod shaft 40 defines an elongated opening 50, which receives a biasing member 52 shown here in the form of a spring. The biasing member 52 is compressed between a floor 53 and a terminal wall 54 of the elongated opening 50. Therefore, the biasing member 52 provides a biasing force that telescopes the contact member 38 from the pushrod shaft 40, affectively lengthening the pushrod 14.

Figure 3:
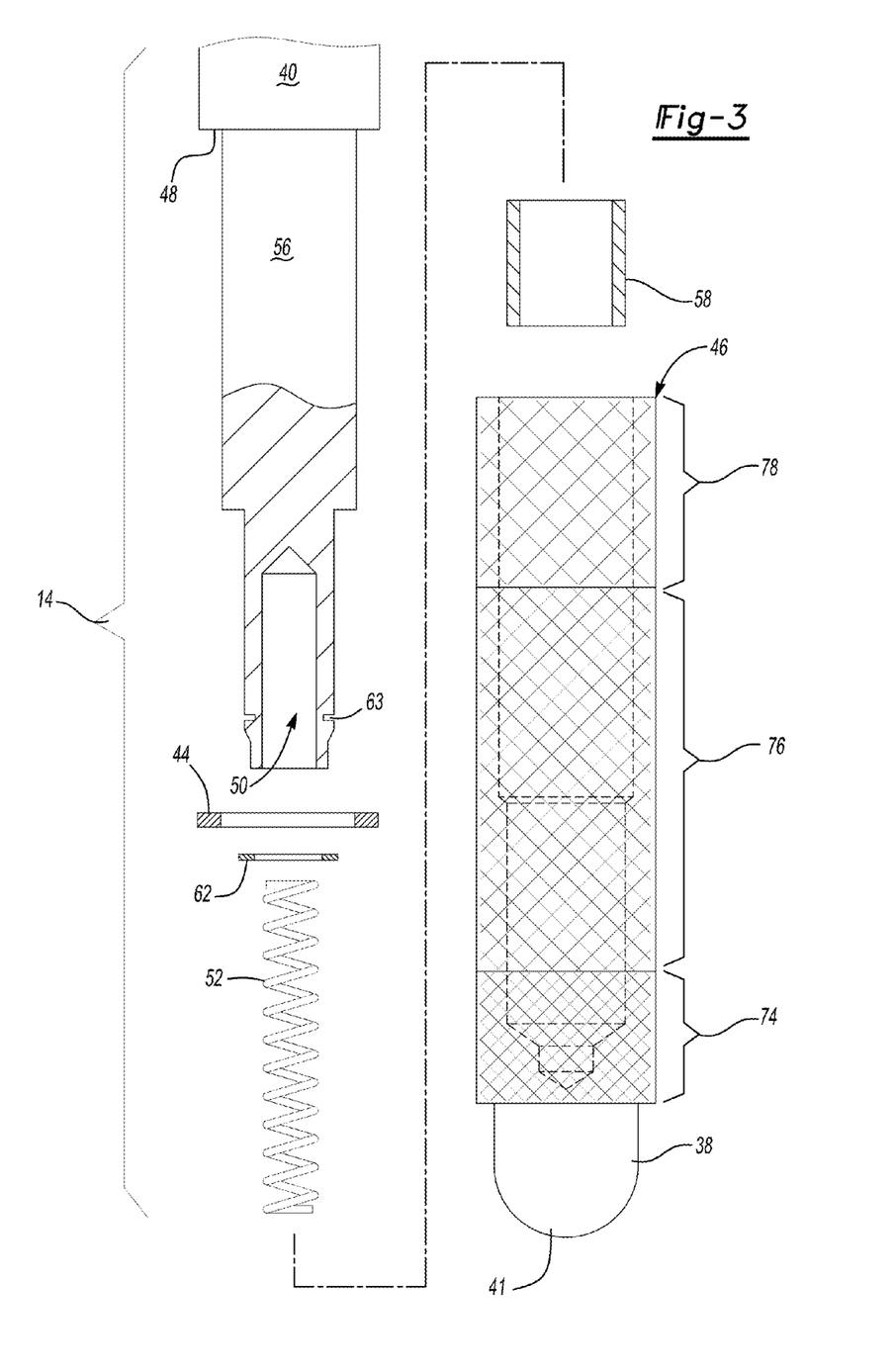
FIG. 3 shows an expanded view of the pushrod of the present invention.

The pushrod shaft 40 defines a circumscribing groove 56 into which a retaining member 58 that is fixedly attached to an inner wall 60 of the tubular member 42 is received. The retaining member 58 slides in an axial direction defined by the pushrod shaft 40 within an expanse of the groove 56. A stop 62 prevents the biasing member 52 from separating the contact member 38 from the pushrod shaft 40 when abutted by the retaining member 58. The stop 62 takes the form of a spring clip or equivalent received by a notch 63 (FIG. 3) in the pushrod shaft 40.

A sensor element 64 is sandwiched between the service chamber 16 and the caliper 36. A sensor 66 is disposed inside the sensor element 64 and is provided sensing access to the contact member 38, which is received through an opening 68 in the sensor element 64. The sensor 66 communicates through communication line 70 with a controller or central processing unit 72. The sensor 66 is contemplated by the inventors to take the form an optical sensor, a magnetic sensor, a mechanical sensor, or a radio frequency enhanced sensor. For clarity, however, the following description will describe an optical sensor, further contemplated to be an infrared sensor. The exemplary embodiment makes use of an Optek infrared optical OPB733TR sensor capable of both transmitting an infrared signal and receiving a reflected infrared input. However, it should be understood by those of skill in the art, that any of the sensors explained above are operable. As best represented in FIG. 2a, the contact member 38 defines a non-reflective surface 74, a semi-reflective surface 76, and a fully reflective surface 78.

As best seen in FIG. 1, a sealing boot 80 seals to the pushrod shaft 40 at an upper end and to the sensor element 64 at an opposite end. Therefore, the contact member 38, and the non-reflective, semi-reflective, and fully reflective surfaces 74, 76, 78 are protected from environmental contamination that is known to enter the service chamber 16. A secondary seal 82 seals the sensor element 64 to the caliper 36, which is fully enclosed to protect the lever arm 34 from environmental contamination. Therefore, the contact member 38 and the sensor 66 are completely protected from the environment, preventing the optical sensor 66 and the reflective surfaces 74, 76, 78 from becoming fouled.

Figure 2B:
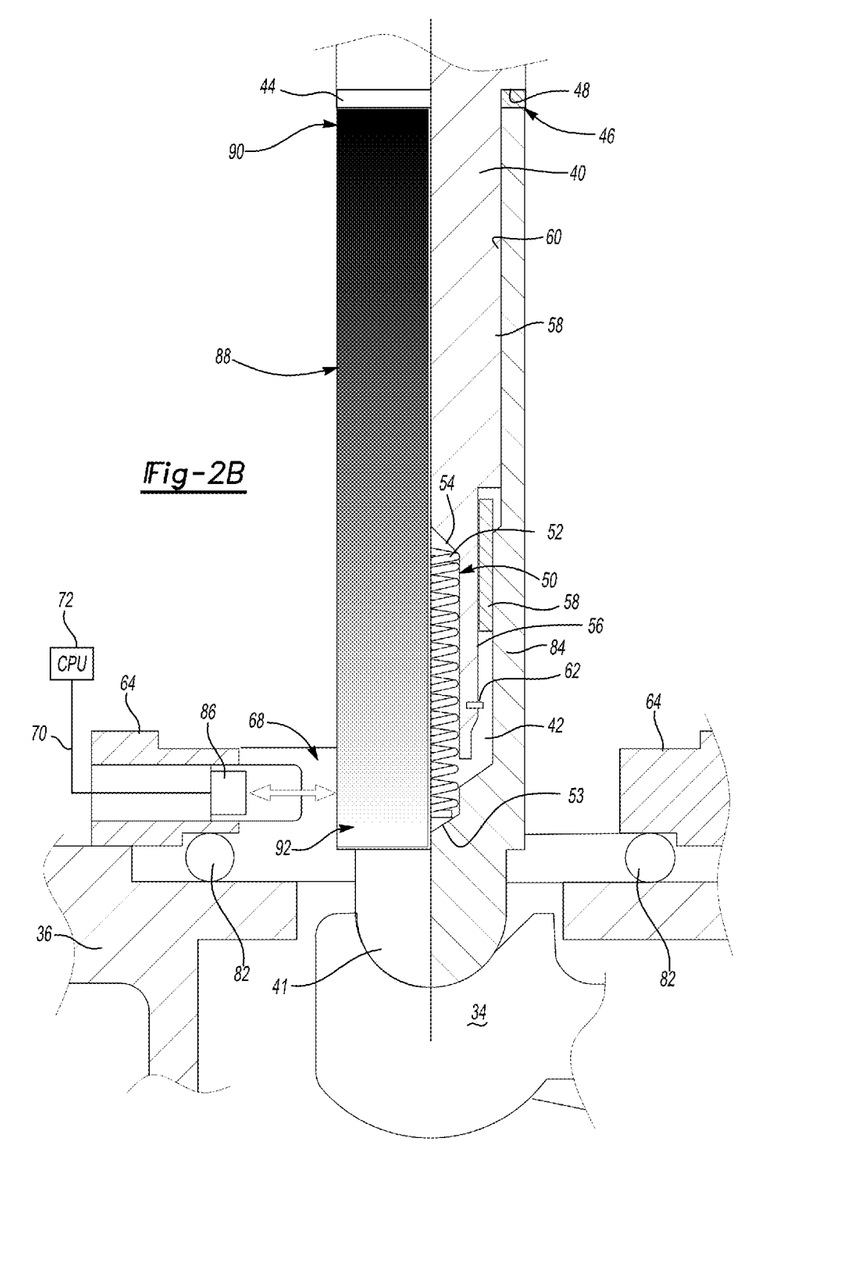
FIG. 2b shows an alternative embodiment of the pushrod of the present invention.

An alternative embodiment is shown in FIG. 2b where common elements have the same numbers as those elements disclosed in FIG. 2a. The alternative embodiment makes use of an alternative contact member 84 and a linear sensor 86. The alternative contact member 84 includes an alternative reflective coating 88 that has a variable reflective surface. A first end 90 of the contact member is more reflective than a second end 92 of the contact member with a gradual transition in between. The sensor detects the variation in the amount of reflectivity to determine the location of the alternative contact member 84, and therefore the lever arm 34 as will become more evident in the description below.

The sequence of brake monitoring will now be described. It is contemplated by the inventors that the sensor 66 takes the form of an infrared sensor that transmits an infrared signal toward the contact member 38 which has varying degrees of reflectivity as described above to reflect the infrared signal back toward the sensor 66, which in turn signals the controller 72 the degree of reflectivity via communication lines 70. It should be understood to those of skill in the art that other optical sensors may be used, including photoelectric digital lasers, ordinary lasers, and equivalents.

During normal operation, when the brake is released (shown in FIG. 1), the optical sensor transmits a light signal toward the non-reflective surface 74 of the contact member 38 receiving no reflective signal from the contact member 38. The brake application pressure, as indicated by the pressure sensor 32, is less than or equal to about 2 psi. Therefore, no active fault is signaled to the vehicle operator.

Figure 4:
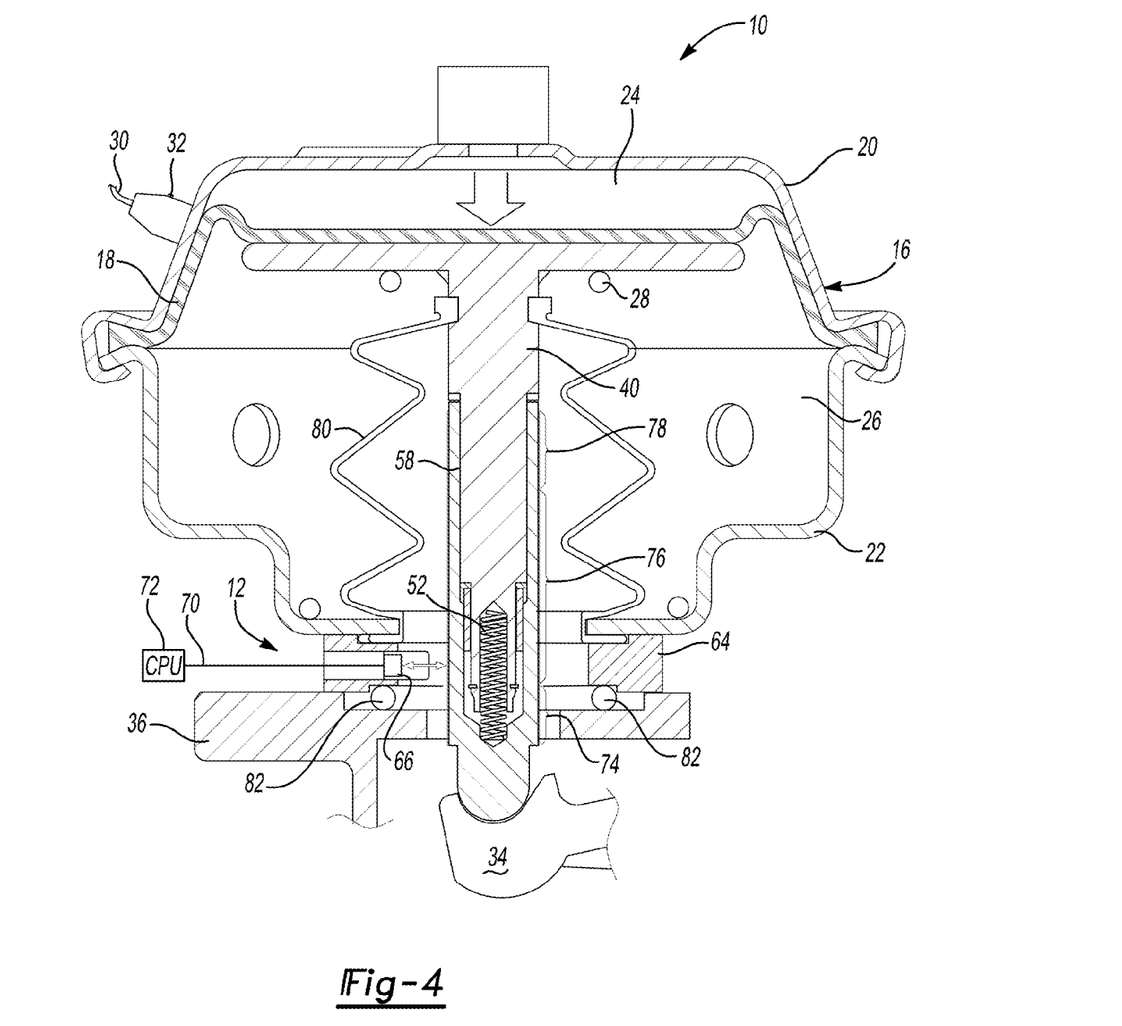
FIG. 4 shows the brake actuator in an extended position in a normal operating condition.

Referring now to FIG. 4, pressure is applied to the brake pedal by the operator causing air to fill the pressure side 24 of the service chamber 16 to actuate the lever arm 34.

Because the pushrod 14 is forced outwardly from the service chamber 16 by the diaphragm 18, the sensor 66 is positioned proximate the semi-reflective surface 76 of the contact member 38. The pressure sensor 32 signals air pressure of greater than or equal to about 2 psi indicating normal operation of the brake actuator 10 so long as the sensor 66 detects reflectivity from the semi-reflective surface 76. It is contemplated by the inventors that the semi-reflective surface 76 reflects about thirty percent of the light transmitted from the sensor 66. It should be noted that the biasing member 52 remains fully compressed because the lever arm 34 counteracts the biasing force of the biasing member 52 during normal, activated condition.

Figure 5:
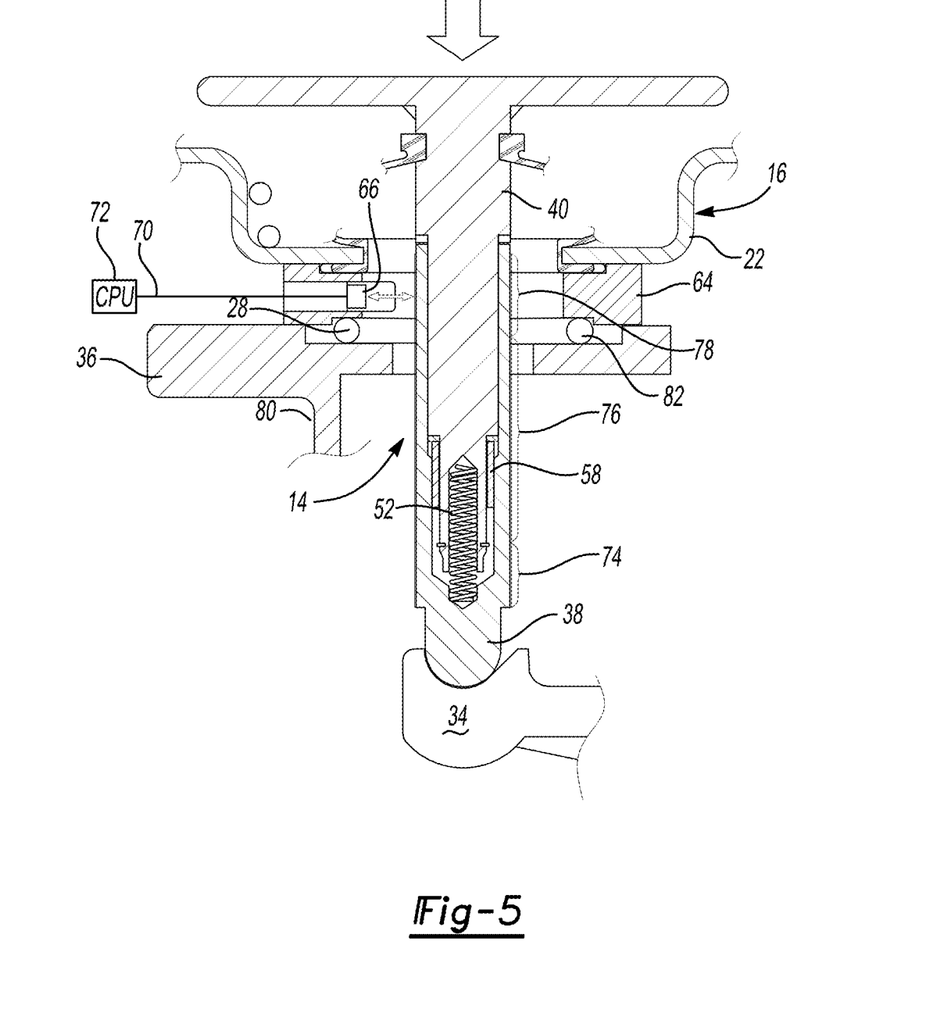
FIG. 5 shows a partial sectional view of the brake actuator in an over stroke condition.

FIG. 5 shows an overstroke condition causing the controller 72 to signal the operator that a fault condition exists. In the overstroke condition, the pushrod 14 extends outwardly of the service chamber 16 beyond normal extension length so that the sensor 66 transmits light to the fully reflective surface 78 and detects a full reflectivity. The brake pressure, as detected by the pressure sensor 32, is greater than or equal to about 2 psi. Therefore, the sensor 66 signals the controller 72 full reflectivity with normal application pressure causing the controller to signal an over stroke condition to the operator.

Figure 6:
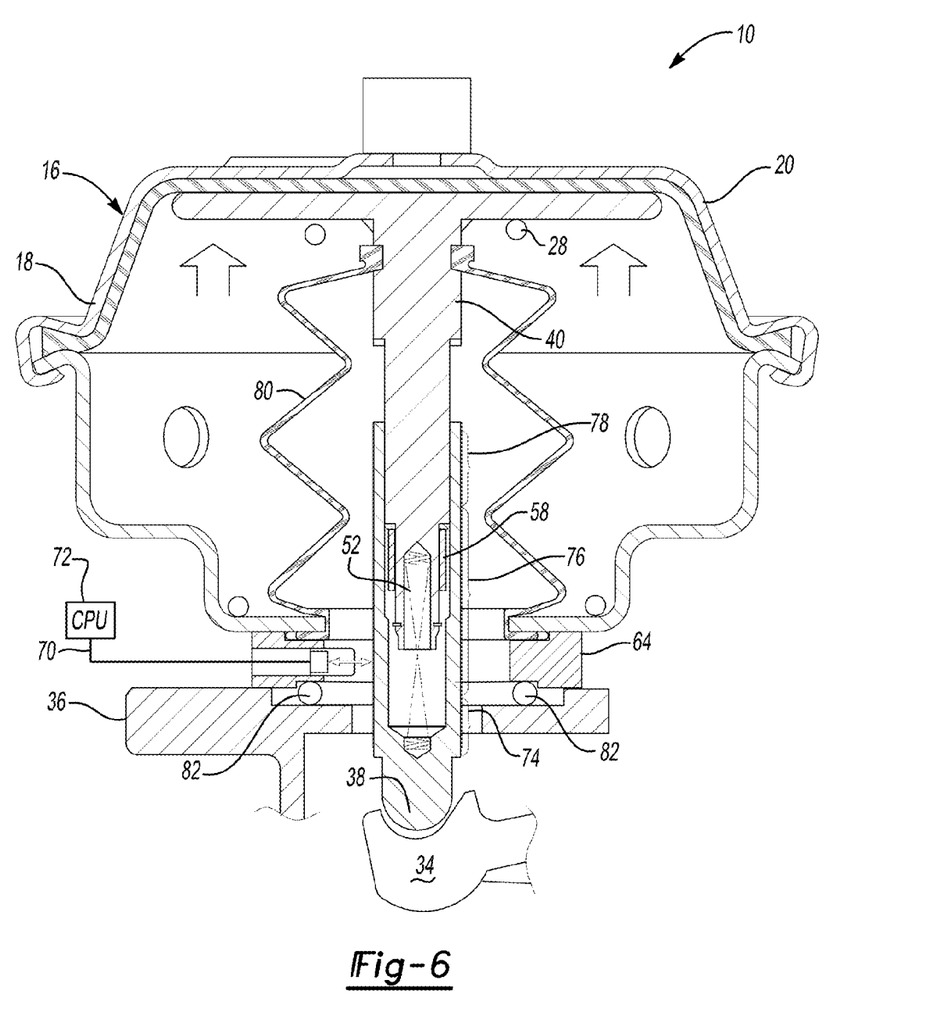
FIG. 6 shows the brake actuator of the present invention having a hanging or dragging brake condition.

FIG. 6 represents a dragging brake condition. The dragging brake condition is identified by the controller 72 both when the vehicle is moving at road speed and when the vehicle is not moving at road speed. In the dragging brake condition, air pressure has been released from the pressure side 24 of the service chamber 16 causing the return spring 28 to retract the pushrod 14 into the service chamber 16. However, because the brake is now subject to a dragging condition, the lever arm 34 is retained in the actuated position causing separation with the contact member 38. Because the lever arm 34 is no longer counteracting the biasing force of the biasing member, the biasing member 52 causes the contact member 38 to telescope from the pushrod shaft 40. Therefore, the sensor 66 now transmits light toward the semi-reflective surface 76 of the contact member 38 as opposed to transmitting light toward the non-reflective surface 74 as is typical of a normally functioning brake. Because the pressurized air has been vented from the pressure side 24 of the service chamber 16, the brake application pressure now reads less than or equal to about 2 psi. The combination of the semi-reflective surface 76 being detected by the sensor 66 and the low air pressure of less than or equal to about 2 psi causes the controller 72 to indicate a dragging or hanging brake condition.

A further fault condition is indicated when the sensor 66 detects the non-reflective surface 74 when the brake pedal is depressed by the operator causing an air pressure reading of greater than or equal to about 12 psi. In this instance, the controller signals a non-functioning actuator condition to the operator.

Calipers used in heavy duty truck applications are typically self-adjusting to maintain a consistent running clearance between the brake pads and the rotor as the brake pad wears down. When functioning properly, the self-adjusting caliper adjusts to maintain consistent clearance as the brake pads wear over time. The self-adjusting caliper is known to malfunction and create an out of adjustment condition where the clearance between the brake pads and the rotor is less than desirable, e.g. less than 0.6 mm. In this situation, a normal use of the brake system causes faster brake pad wear, unwanted heat generation resulting in fires, or other issues.

An out of adjustment or low lining brake clearance condition can be detected by the controller 72. For example, pressure is applied to the brake pedal by the operator causing air to fill the pressure side 24 of the service chamber 16 to actuate the lever arm 34. Because the pushrod 14 is forced outwardly from the service chamber 16 by the diaphragm 18, the sensor 66 is positioned proximate the semi-reflective surface 76 of the contact member 38. The pressure sensor 32 signals air pressure of greater than or equal to about 2 psi indicating normal operation of the brake actuator 10 so long as the sensor 66 detects reflectivity from the semi-reflective surface 76. As pressure continues to be applied to the brake pedal by the operator, the push-rod and lever 34 reach a hard stop because the brake pad clearance is low due to the out of adjustment condition. Depending on the severity of the out of adjustment condition, the sensor 66 may be positioned proximate the crossover point between the semi-reflective surface 76 and the non-reflective surface 74. In this position, as normal variations in pressure occur the position of the sensor 66 will dither between the semi-reflective surface 76 and the non-reflective surface 74. The combination of dithering and normal air pressure readings causes the controller 72 to indicate an out of adjustment condition. Variations in pressure occur even when the operator attempts to maintain a constant brake pedal position.

False positive out of adjustment signals are reduced by triggering an out of adjustment condition in response to a pre-defined number of pre-cursor out of adjustment faults in combination with a pre-defined number of non-function faults. A pre-cursor fault counter is used to detect the number of dithers between the semi-reflective zone 76 and the non-reflective zone 74 within an ignition cycle. A non-function fault counter is used to detect the number of non-function faults within a controller 72 power cycle. In this embodiment, an out of adjustment condition is identified after a pre-defined number of pre-cursor out of adjustment conditions and a pre-defined number of non-functioning faults are detected. For example, in one embodiment, two pre-cursor out of adjustment faults and two non-function faults trigger an out of adjustment condition.

As set forth above, instead of being non-reflective, semi-reflective, and fully reflective surfaces 74, 76, 78, the surfaces include other pre-defined indicia capable of transmitting light to identify the amount of extension of the pushrod 14. For example, in one embodiment, the surface 76 is a fully reflective surface, while the surfaces 74 and 78 are both non-reflective. In this way, the sensor 66 can provide a binary signal. In such an embodiment, the controller determines there is a fault condition, but additional logic may be implemented to determine the specific fault condition. When the sensor detects a non-reflective surface 74 or 78 during normal brake application pressures and the sensor never detects fully reflective surface 76, then the controller 72 determines the non-reflective surface 74 was detected and the fault is a non-functioning brake fault. When the sensor detects a reflective surface 76 followed by a non-reflective surface 74 or 76 during normal brake application pressures, the controller 72 determines the fault condition is either an over-stroke condition or an out of adjustment condition. In one embodiment, the over-stroke condition and out of adjustment condition is distinguished by monitoring the return stroke of the pushrod. If the sensor detects the fully reflective surface 76 as the pressure falls to the resting pressure, then the controller 72 determines the non-reflective surface 76 was detected and the fault is an over-stroke fault. If the sensor does not detect the fully reflective surface 76 as the pressure falls, then the controller determines the non-reflective surface 74 was detected and the fault is an out of adjustment condition.

The invention has been described in an illustrative manner, and it is to be understood that the terminology that has been used is intended to be in the nature of words of description rather than of limitation.

Obviously, many modifications and variations of the present invention are possible in light of the above teachings. For example, a hall effect or equivalent sensor can be used in combination with a magnet affixed to the contact member 38 having varying degrees of magnetism. It is therefore to be understood that within the specification, the reference numerals are merely for convenience, and are not to be in any way limiting, the invention may be practiced otherwise than is specifically described.

What is claimed is:

1. A method of detecting a fault condition of an air disc brake, comprising the steps of:
    providing a brake actuator having a pushrod being extensible from said brake actuator for actuating a lever arm of an air disc brake;
    monitoring, with a pushrod sensor, a changing length of extension of said pushrod from said brake actuator;
    monitoring, with a pressure sensor, an air pressure of said brake actuator;
    counting, with a dithering counter, a number of dithers of said pushrod between two positions while monitoring said length of extension of said pushrod from said brake actuator;
    determining, with a processor, a low lining brake clearance condition of said air disc brake based on a combination of said counting said number of dithers of said pushrod between two positions while monitoring said changing length of extension of said pushrod and said air pressure of said brake actuator.

2. The method set forth in claim 1, wherein said step of monitoring length of extension of said pushrod is further defined by sensing variation of indicia disposed upon said pushrod.

3. The method set forth in claim 2, further including the step of correlating air pressure of said brake actuator with a normal actuated position and a normal retracted position.

4. The method set forth in claim 3, including detecting a normal condition by sensing pre-defined indicia on said pushrod in response to sensing air pressure correlated with normal actuated position of said brake actuator.

5. The method set forth in claim 3, including detecting an over-stroke condition by sensing pre-defined indicia on said pushrod in response to sensing air pressure correlated with normal actuated position of said brake actuator.

6. The method set forth in claim 5, including determining whether a fault condition is said low lining brake clearance condition or said over-stroke condition based on said monitoring length of extension of said pushrod and said monitoring air pressure of said brake actuator during a return stroke of said pushrod.

7. The method set forth in claim 3, including detecting a non-functioning condition by sensing pre-defined indicia on said pushrod in response to sensing air pressure correlated with normal actuated position of said brake actuator.

8. The method set forth in claim 3, wherein detecting said low lining brake clearance condition includes sensing a first pre-defined indicia on said pushrod in response to sensing air pressure correlated with normal actuated position of said brake actuator and sensing a second pre-defined indicia on said pushrod in response to sensing air pressure correlated with normal actuated position of said brake actuator.

9. The method set forth in claim 3, wherein detecting said out of adjustment fault condition includes:
    counting said number of dithers of said pushrod as a plurality of pre-cursor out of adjustment faults, with each pre-cursor out of adjustment fault being sensed by sensing a first pre-defined indicia on said pushrod in response to sensing air pressure correlated with normal actuated position of said brake actuator and sensing a second, different, pre-defined indicia on said pushrod in response to sensing air pressure correlated with normal actuated position of said brake actuator; and
    detecting a plurality of non-functioning conditions each by sensing pre-defined indicia on said pushrod in response to sensing air pressure correlated with normal actuated pressure of said brake actuator; and
    wherein detecting said plurality of pre-cursor out of adjustment faults and said plurality of non-functioning faults occurs during a power ignition cycle of a vehicle.

10. The method set forth in claim 2, wherein said step of sensing variation of said indicia is further defined by sensing variation of reflectivity of said indicia.

11. The method set forth in claim 10, wherein said step of sensing variation of reflectivity of said indicia is further defined by sensing linear variation of reflectivity of said indicia.

12. The method set forth in claim 10, wherein said step of sensing variation of reflectivity of said indicia is further defined by sensing a plurality of distinctive surfaces of said indicia, each surface having differing amounts of reflectivity.

13. A vehicle brake monitor assembly comprising:
    a brake actuator having a pushrod slidably extending from a chamber of said brake actuator, said pushrod actuating a lever arm thereby moving the vehicle brake into an actuated position when said pushrod is disposed in an extended position and allowing the vehicle brake to move into a retracted position when said pushrod is disposed in a retracted position;
    a pressure sensor for sensing pressure from actuating a brake pedal;
    an optical sensor transmitting a light signal toward the pushrod and sensing an amount of reflectivity of a plurality of zones;
    a controller programmed to determine which of a plurality of fault conditions of said brake actuator is present dependent upon output from said pressure sensor and said optical sensor; and
    said controller determines a low lining clearance condition by said optical sensor by sensing a number of dithers of said pushrod between adjacent zones when said pressure sensor senses normal air pressure.

14. The assembly set forth in claim 13 wherein said controller correlates air pressure with amount of reflectivity thereby determining if said actuator is in a normal condition or a fault condition.

15. The assembly set forth in claim 13 wherein said pushrod includes indicia indicative of a normal actuated position, a normal retracted position, and an over-stroke position.

16. The assembly set forth in claim 15, wherein said controller determines normal condition is present by sensing said amount of reflectivity indicative of said normal actuated position in response to sensing air pressure correlated with normal actuated position of said brake actuator.

17. The assembly set forth in claim 15, wherein said controller determines an over-stroke condition is present by sensing said amount of reflectivity indicative of said over-stroke position in response to sensing air pressure correlated with normal actuated position of said brake actuator.

18. The assembly set forth in claim 15 wherein said controller determines a non-functioning condition is present by sensing said amount of reflectivity indicative of said retracted position in response to sensing air pressure correlated with normal actuated position of said brake actuator.

19. The assembly set forth in claim 15 wherein said controller determines an out of adjustment condition is present by:
  sensing said amount of reflectivity indicative of said normal position in response to sensing air pressure correlated with normal actuated position of said brake actuator; and
  sensing said amount of reflectivity indicative of said retracted position in response to sensing air pressure correlated with normal actuated position of said brake actuator.

20. The assembly set forth in claim 15 wherein said controller is programmed to determine an out of adjustment condition is present by:
  detecting a pre-defined number of dithers of said pushrod as a plurality of pre-cursor out of adjustment faults, with each pre-cursor out of adjustment fault being sensed during a brake actuation by:
  sensing said amount of reflectivity indicative of said normal position in response to sensing air pressure correlated with normal actuated position of said brake actuator; and
  sensing said amount of reflectivity indicative of said retracted position in response to sensing air pressure correlated with normal actuated position of said brake actuator for a pre-determined amount of time; and
  detecting a plurality of non-functioning conditions each by sensing said amount of reflectivity indicative of said retracted position in response to sensing air pressure correlated with normal actuated pressure of said brake actuator; and
  wherein detecting said plurality of pre-cursor out of adjustment faults and said plurality of non-functioning faults occurs during a power ignition cycle of a vehicle.

21. The assembly set forth in claim 15, wherein said pushrod has a variable reflective surface where a first end of the pushrod is more reflective than a second end of the pushrod with a gradual transition of said variable reflective surface in between.

22. The assembly set forth in claim 21 wherein said controller is programmed to distinguish between an over-stroke condition and an out of adjustment condition by monitoring said amount of reflectivity during a return stroke of said pushrod.

23. The assembly set forth in claim 22 wherein said controller is programmed to distinguish between said over-stroke condition and said out of adjustment condition by sensing said amount of reflectivity indicative of said normal position during said return stroke of said pushrod.

* * * * *